United States Patent [19]

Hendriks

[11] Patent Number: 4,922,709
[45] Date of Patent: May 8, 1990

[54] PLANT FOR THE GENERATION OF MECHANICAL ENERGY, AND A PROCESS FOR GENERATING THE ENERGY

[75] Inventor: Rudolf Hendriks, Velp, Netherlands
[73] Assignee: Turbo Consult B.V., Netherlands
[21] Appl. No.: 276,900
[22] Filed: Nov. 28, 1988
[30] Foreign Application Priority Data
  Nov. 26, 1987 [NL] Netherlands .............. 8702834
[51] Int. Cl.$^5$ ............................................... F02C 6/00
[52] U.S. Cl. ..................................... 60/39.183; 60/683
[58] Field of Search ............................ 60/683, 39.183
[56] References Cited
  FOREIGN PATENT DOCUMENTS
  2224642 10/1974 France .......................... 60/39.183
  604028  6/1948 United Kingdom ............ 60/39.183

OTHER PUBLICATIONS

European Patent Application: 0-208-162 General Electric; Jan. 1987.

Primary Examiner—Allen M. Ostrager
Attorney, Agent, or Firm—Arnold S. Weintraub; Gerald R. Black

[57] ABSTRACT

A plant for the generation by means of a gaseous fluid of mechanical energy comprising an assembly consisting of a gas turbine (1) with a combustion chamber (4) and a compressor unit (C) driven by a turbine (T). The turbine (T) is fed by compressed air from the unit (C) after its passage through a main heat exchanger (3) arranged in the exhaust of the gas turbine (1). The outlet (10) of the compressor-turbine (T) is in fluid communication with the combustion chamber (4).

5 Claims, 3 Drawing Sheets

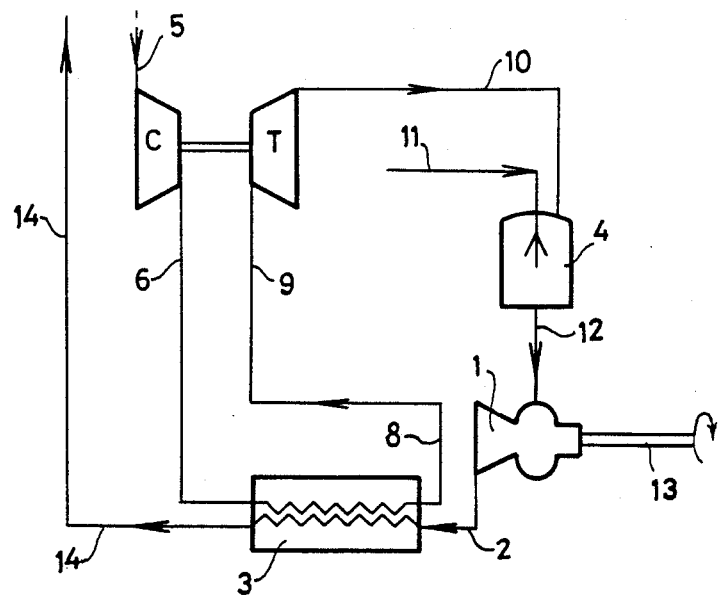
_Fig. 1._
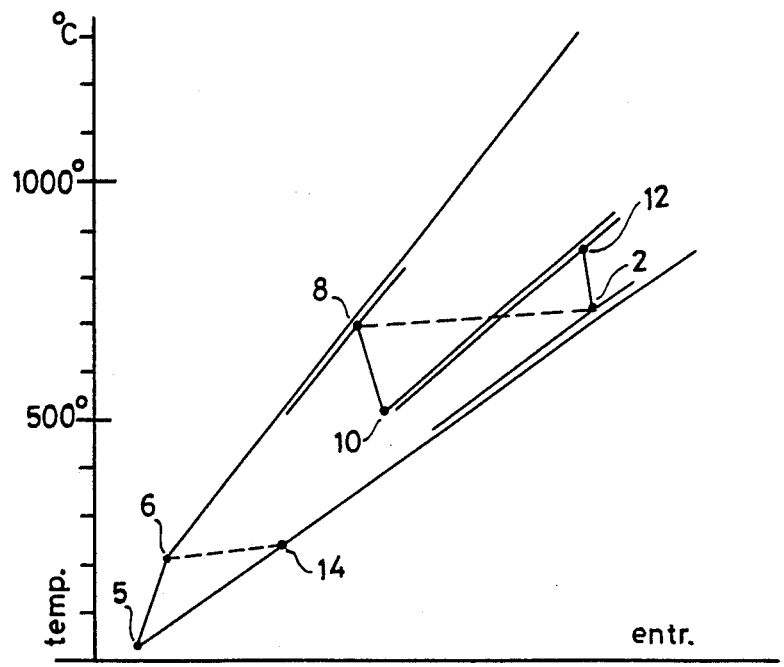
_Fig. 2._

4,922,709

PLANT FOR THE GENERATION OF MECHANICAL ENERGY, AND A PROCESS FOR GENERATING THE ENERGY

FIELD OF THE INVENTION

This invention relates to a plant for the generation of mechanical energy by means of a gaseous fluid. The plant comprises a gas turbine and a compressor unit, driven by a compressor-turbine, in which the turbine is in series with and in fluid communication with the compressor unit.

BACKGROUND OF THE INVENTION

A plant for generating mechanical energy by means of a gaseous fluid is known in various designs, but until now no one has succeeded in designing a plant with an acceptable efficiency level (+35%) which can compete with other conventional generator units, such as internal combustion engines, or steam turbines.

These conventional power units emit noxious exhaust fumes of the gas turbine. Conventionally, combustion chambers are added to the compressor turbines to increase the temperature of the gaseous fluid. The addition of the combustion chambers enhances the emission of noxious combustion products.

SUMMARY OF THE INVENTION

It is the object of this invention to produce a plant having an efficiency of about 40%, can operate in the region between 50 and 3000 KW, and can limit noxious emissions. One use for the present invention is in the driving of trains or ships, where a plant which can supply power of the order of 700 KW is needed. The plant according to the invention is unique in that the gas turbine, also called the power-turbine, is provided with a combustion chamber, the discharge of the expanded air from the (last) compressor turbine being connected to this combustion chamber, and the connecting conduit from the compressor unit to the compressor turbine is incorporated into a main heat exchanger in the exhaust of the gas turbine.

One important element of the present invention is that the drive turbines of the compressor are not fed by the exhaust gases of the turbine, but that the compressed air is so used before being taken to the power turbine. The invention thus permits operation which comes closser to the theoretical CARNOT cycle than has been previously achieved. This enables a fundamental increase in the thermal efficiency of the whole plant. Moreover, the important components of the plant are already commercially available, which is extremely important to the cost efficiency of the plant.

U.S. Pat. No. 3,054,257 to Schelp provides each turbine in a plant for the generation of mechanical energy, with an additional combustion chamber to raise the temperature of the fluid in these turbines. This reference applies a combustion only chamber to the power turbine, thereby using the calories recovered from the exhaust of the power turbine to heat the fluid prior to circulation through the compressor turbine.

There are two primary additional advantages of the present invention. Besides the approximation of the CARNOT-cycle and the construction out of commercially available components, the proposed new plant renders a very "clean" operation possible, internally as well as externally. The compressors and the turbines belonging thereto are traversed by completely unpolluted air, resulting in little or no internal pollution. The gaseous fluid fed into the combustion chamber of the power turbine operates under a very low pressure (in the order of 200 kPa) and involves a relative low temperature at the power turbine (in the order of 900° C.). Under those circumstances the $NO_x$ emission is very low so that the burden put on the environment is reduced.

If the compressor unit of the plant according to the invention consists of at least two parts, a further improvement in efficiency can be obtained by having at least one additional heat exchanger in the conduit between parts of the compressor unit. Where mention is made of heat exchangers, herein either recuperative or the regenerative type may be used.

Another feature of the invention is that the power turbine of the plant is designed as a single-flow centripetal turbine. This turbine permits a temperature reduction of about 100 degrees Centigrade between the entry into the turbine housing and the tip of the rotor blades. The relatively high temperatures in the combustion chamber are quickly lowered without the need for rotor cooling.

Another important embodiment of the plant is distinguished in that, in addition to the heat exchanger as the interim cooler in the compressor unit, another external heat exchanger is provided in the outlet of the gas turbine downstream of the existing main heat exchanger. Still another heat exchanger is disposed in the outgoing conduit of the last compressor turbine upstream of the combustion chamber of the power turbine. Such an embodiment makes the plant extremely suitable for use as a total energy system, which leads to a further improvement to the total efficiency of the plant.

The striving for a low $NO_x$ content in the exhaust fumes of the power turbine, can still further be promoted by providing an injector within the combustion chamber. The injector is connected to a water storage tank through a conduit with a pump, the tank being in fluid communication with the portion of the connecting conduit which is cooled in the heat exchanger. In principle, the injection of water or steam into the flame of the combustion chamber of a gas turbine is known. According to the invention the water originates from the condensate of the compressed combustion air. This condensate is collected through a throttle valve and a filter into the storage tank. From there, the pump is able to pass an appropriate amount of condensate into steam, such as in the heat exchanger of the exhaust disposed by the injector.

The inventive concept is also applicable to a process for the operation of the above-described installation. This process is distinguished in that in its application to the total energy principle in a greenhouse for flowers and vegetables or the like, clean fuel (such as in natural gas from Groningen, the Netherlands) is supplied to the combustion chamber. The necessary external heat exchangers are utilized to achieve the predetermined rate (H/P) between thermal and mechanical power given off, and the cooled exhaust gases from the power turbine are released in the greenhouse. By these measures the $CO_2$ gas is available for assimilation by the plants. It is further rendered possible to determine the heat output independently of the required mechanical power, and vice versa. The plant is therefore exceptionally well suited for use in varying circumstances regarding the demand for mechanical power and/or heat.

BRIEF DESCRIPTION OF THE DRAWINGS

The invention will be explained in greater detail with reference to the drawings, which shows a number of embodiments of the plant and the accompanying graphs.

FIG. 1 shows a schematic illustration of the plant of the present invention;

FIG. 2 shows the accompanying T-S graph relating to FIG. 1;

FIG. 5A shows a variation of the embodiment depicted in FIG. 3; and

DESCRIPTION OF THE PREFERRED EMBODIMENTS

Figure 3:
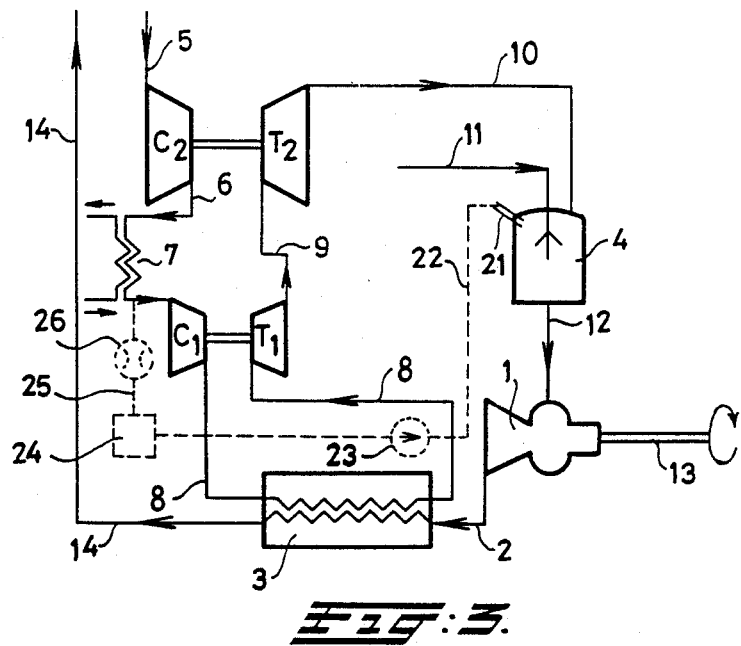
FIG. 3 shows another embodiment with an additional heating stage between the compressor turbines used.

FIG. 1 depicts an assembly comprising a single compressor unit C. The assembly also contains a gas turbine 1 which provides the net energy, the turbine being preferably a power turbine. The power turbine has an exhaust 2, into which a main heat exchanger 3 is incorporated. The compressor unit C is driven by a separate compressor turbine. T. The power turbine 1 is provided with a combustion chamber 4 shown separately in FIG. 1. The compressor C is provided with a suction conduit 5 and a delivery conduit 6, which via the main heat exchanger 3 and a conduit 9 leads to the compressor turbine T, the exhaust of which is connected by means of a conduit 10 to the combustion chamber 4.

It will be clear that the compressor unit C is connected in series by means of the connecting conduits 6, 8 and 9 to the compressor turbine T. Through the main heat exchanger 3, the temperature of the compressed air exiting from the compressor unit C is further increased. As a result, the turbine T can supply sufficient power for the compressor C. The spent and still compressed air flows through the conduit 10 to the combustion chamber 4, while fuel is injected through a conduit 11 into this chamber 4 and consumed. The low-pressure gas mixture thus obtained flows through the conduit 12 to the power turbine 1 for the release of mechanical energy through the shaft 13. The exhaust 2 of the power turbine 1 is discharged through a conduit 14 after passing through the main heat exchanger 3.

The process taking place within the plant according to FIG. 1 is shown schematically in FIG. 2. The T-S graph shows clearly the special advantage of the measure which is essential for the plant according to FIG. 1. The compressor turbine T is not driven, as has often been proposed, by the exhaust gases of the power turbine, but is driven by the compressed air from the compressor unit C, after the air is further heated through heat exchange with the exhaust gases of the power turbine. Hence, the graph shown in FIG.2 is much closer to the configuration of the (ideal) CARNOT cycle. The expansion ranges of the cycle lie near the region with the highest temperature, which has a favorable influence on the efficiency of the plant.

Figure 4:
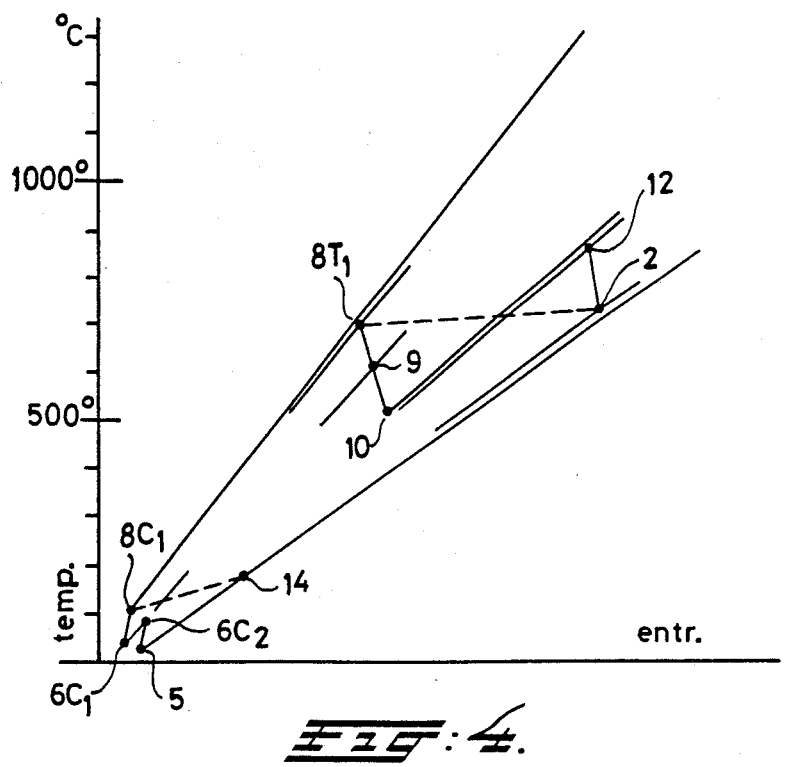
FIG. 4 shows the accompanying T-S graph relating to FIG. 3.

The embodiment depicted in FIG. 3 shows the compressor unit materialized with a low pressure compressor $C_2$ and a high pressure compressor $C_1$, each being individually driven by a turbine $T_2$ and $T_1$, respectively. Further, a heat exchanger 7 or cooler is provided in the connecting conduit 6 between the compressor parts $C_2$ and $C_1$. FIG. 4 shows the accompanying T-S diagram.

Referring the FIG. 3, the following numbers represent a hypothetical plant having a net power of 700 kW:

inlet temp. $C_2$ ... 15° C.
outlet temp. $C_2$ ... 114° C.
outlet pressure $C_2$ ... 250 kPa
inlet temp. $C_1$ ... 30° C.
outlet temp. $C_1$ ... 139° C.
outlet pressure $C_1$ ... 610 kPa
increase temp. traject of air in heat exchanger, 3 ... 560° C.
decrease in temp. traject of exhaust gas in heat exchanger 3 ... 545° C.
pressure ratio over $T_1$ ... 1.6
temp. in conduit 9 ... 605° C.
pressure ratio over $T_2$ ... 1.82
temp. in conduit 10 ... 510°
temp. in conduit 12 ... 890°
pressure in do. ... 200 kPa
power in shaft 13 ... approx. 700 kW
temp. in conduit 2 ... 730° C.

Figure 5:
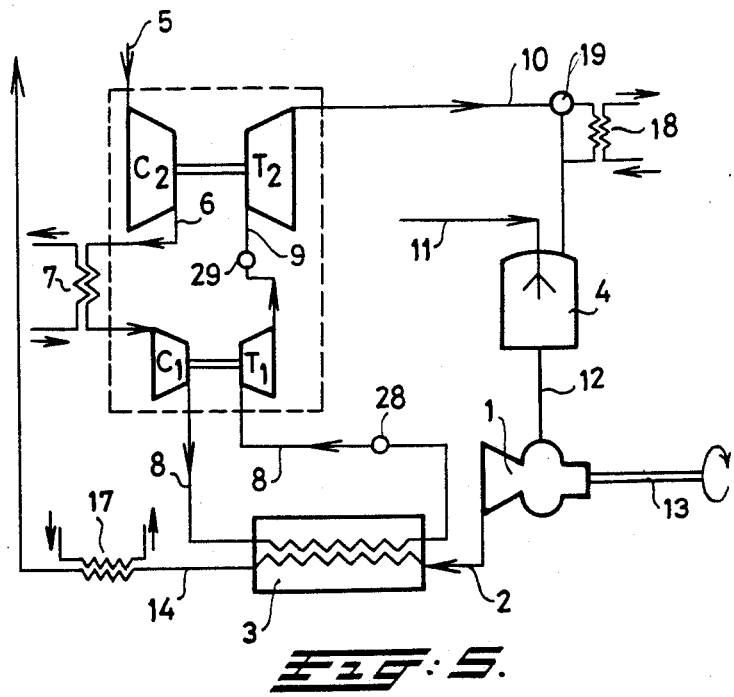
FIG. 5 shows schematically a total energy application of the plant.

Additionally, both FIG. 3 and FIG. 5A depict in dotted lines, an injector 21 in the combustion chamber 4. A feed duct 22 with a pump 23 connects this injector with a storage tank 24 for filtrated condensate. This condensate originates from the portion of the connecting conduit 6 lying within or beyond the heat exhanger 7. A discharge duct 25 feeds the condensate through a throttle valve 26 to the storage tank 24. The water or stream injection into the combustion chamber 4 rendered feasible herewith, brings about a further decrease in the emission of $NO_x$. The feed duct 22 may be channeled through the heat exchanger 3 to heat the condensate to steam. In its application to a horticultural enterprise (market-gardening), the obtained condensate can be advantageously used for spray water. FIG. 5 is a schematic illustration of a plant which is especially suitable for total energy operation. This configuration increases the efficiency of the plant still further through the use of a number of external heat exchangers, in addition to the existing heat exchanger 7, which acts as an intermediate cooler of the compressor unit C. A first added external heat exchanger 17 is present in the exhaust of the gas turbine 1, beyond the heat exchanger 3; and a second external heat exchanger 18 is located in the outgoing conduit 10 of the last compressor turbine $T_2$, upstream of the combustion chamber 4 of the power turbine 1.

A three-way valve 19 is further disposed in the conduit 10. The quantity of compressed air fed directly to the power turbine can be regulated with this valve, while the remaining air flows through the heat exchanger 18. In one end position of the valve 19 all compressed air flows directly via the conduit 10 to the combustion chamber 4, while in the other end position all air is fed through the heat exchanger 18, and subsequently reaches the combustion chamber 4. Through the correct regulation of the valve 19 and of the fuel feed in the conduit 11 and by the activation of the external heat exchangers 17, 18, a predetermined h/p ratio can be achieved between the thermal power given off in the heat exchangers 7, 17 and 18 and the mechanical power delivered through the shaft 13.

FIG. 5 also shows additional means 28 and 29 provided in the conduits 8 and 9 for influencing the temperature in the turbines $T_1$ and $T_2$. When the plant is applied for generating electricity (such as in a hospital), a sudden change in the load of the shaft 13 of the power turbine 1 is often experienced. When the load is raised, the fuel supply through the conduit 11 is increased and the temperature in the exhaust 2 will rise. Resulting from high thermal inertia, the main heat exchanger 3 will only gradually transmit this temperature increase to the fluid previously compressed by the compressors $C_1$ and $C_2$. Consequently, and rotational speed of the turbines $T_1$ and $T_2$ or the speed of the compressor will not immediately change. This delayed reaction of the compressor unit may cause instability in plant operation. To avoid this phenomenon, the means 28, and 29 are useful to supply a small amount of heat (e.g. through auxiliary burners or electrical heating elements, not shown) to the fluid prior to its entry into the turbines $T_1$ and $T^2$, respectively. The compressor unit having a low $GD^2$ value, will react immediately, thus avoiding the above-mentioned instability. The additional means, 28 and 29 are also capable of preventing instability during a drop of load in the shaft 13 of the power turbine 1.

Figure 6:
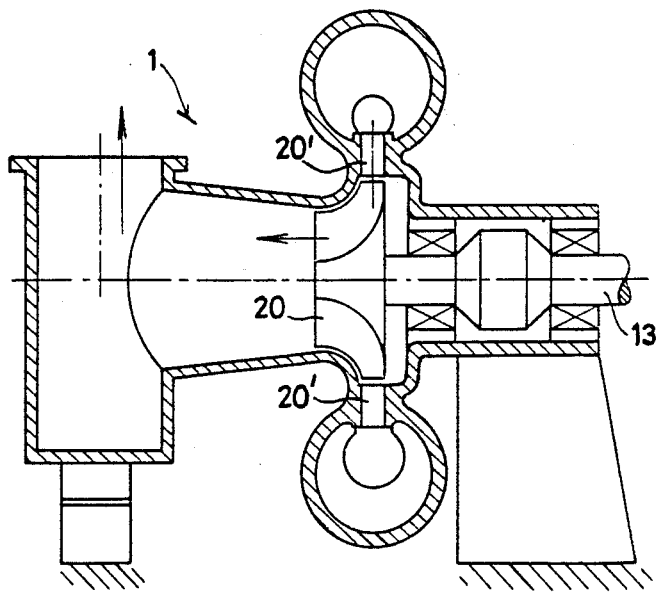
FIG. 6 is a longitudinal section of a very roughly illustrated centripetal power turbine.

FIG. 6 shows a single-flow centripetal turbine which can be used as the power turbine 1 in the plant according to FIGS. 1, 3 and 5. The advantage of this turbine design is, inter alia, that the gases can be supplied at a very high temperature, because before reaching the moving blades 20 a temperature drop of about 100 degrees Centigrade is obtained.

This turbine also makes it possible to deliver a plant for a mechanical capacity which differs by up to 40% from the capacity for which the plant is designed, while maintaining the thermal efficiency. For this, the angle of the guide blades 21 can be adjusted in the factory. In the example given above of a 700 kW-plant, this means that with the same elements a plant can be assembled from about 400 kW to 1000 kW with virtually the same thermal efficiency.

The present invention is particularly applicable in the field of market-gardening, where the following advantages may be attained:

mechanical power for the generation of electricity or for energizing of pumps and the like;

calories for the heating of the internal space of a greenhouse; and the availability of additional $CO_2$ for plant growth.

All this can be achieved with the above described plant in which the exhaust fumes are favorably distinguished by their very low contents of $NO_x$, carbon monoxide, and unburned hydrocarbons.

What is claimed is:

1. A plant for the generation of mechanical energy by using a fluid, the plant comprising:
    (a) a gas turbine;
    (b) a plurality of compressor units;
    (c) a plurality of compressor turbines for driving the compressor units, the compressor turbines being connected in series with the compressor units;
    (d) a combustion chamber connected with the gas turbine, the expanded air from the compressor turbines being directed into the combustion chamber;
    (e) a main heat exchanger being disposed between the compressor turbines and the compressor units, the exhaust from the gas turbine being directed through the main heat exchanger;
    (f) an interim heat exchanger being disposed between the compressor units;
    (g) a first external heat exchanger being disposed downstream of the main heat exchanger; and
    (h) a second external heat exchanger being disposed between the last compressor turbine and the combustion chamber of the gas turbine;
        wherein the first and the second external heat exchangers enable a predetermined h/p ratio to be achieved between the thermal power given off in the interim and the external heat exchangers and the mechanical power delivered to the gas turbine.

2. The plant according to claim 1, wherein an efficiency level of 35% is achieved.

3. The plant according to claim 1, wherein the plant operates in the region of between 50 and 3000 kW.

4. The plant according to claim 1, further comprising an injector disposed in the combustion chamber, the injector being in fluid connection with a water storage tank, the water storage tank being connected between the compressor units on the cooling side of the interim heat exchanger to further reduce the emission of $NO_x$.

5. The plant according to claim 1, further comprising:
    (i) means for raising the temperature of the fluid stream of the compressor turbines.

* * * * *